(12) United States Patent
Okamoto (10) Patent No.: US 10,574,363 B2
(45) Date of Patent: Feb. 25, 2020

(54) ROBOT AND OPTICAL TRANSMISSION DEVICE

(71) Applicant: Seiko Epson Corporation, Tokyo (JP)

(72) Inventor: Junichi Okamoto, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 16/157,788

(22) Filed: Oct. 11, 2018

(65) Prior Publication Data

US 2019/0115982 A1 Apr. 18, 2019

(30) Foreign Application Priority Data

Oct. 12, 2017 (JP) .................................. 2017-198222

(51) Int. Cl.
| | | |
|---|---|---|
| *H04B 10/04* | (2006.01) | |
| *H04B 10/564* | (2013.01) | |
| *B25J 19/00* | (2006.01) | |
| *B25J 15/00* | (2006.01) | |
| *B25J 9/16* | (2006.01) | |
| *H04B 10/079* | (2013.01) | |

(52) U.S. Cl.
CPC .......... *H04B 10/564* (2013.01); *B25J 9/1602* (2013.01); *B25J 9/1612* (2013.01); *B25J 15/0009* (2013.01); *B25J 19/0037* (2013.01); *H04B 10/07955* (2013.01)

(58) Field of Classification Search
CPC ............ H04B 10/564; H04B 10/07955; H04B 10/07; H04B 10/293; H04B 10/0775; H04B 10/0799; H04B 17/00; H04B 10/54; B25J 9/1602; B25J 9/1612; B25J 15/0009; B25J 19/0037; H04J 14/0221; G02B 6/3604; G02B 6/38; G02B 6/40; G02B 6/26; G02B 6/42; G02F 1/011; G02F 1/225

USPC .......... 398/38, 197, 142, 156, 158, 192, 195
See application file for complete search history.

(56) References Cited

U.S. PATENT DOCUMENTS 4,575,297 A * 3/1986 Richter .................. B25J 9/0006
414/5
6,312,398 B1 * 11/2001 Cencer ..................... B64G 6/00
601/33

(Continued)

FOREIGN PATENT DOCUMENTS

| EP | 1629950 A1 | 3/2006 |
|---|---|---|
| JP | 2015-008380 A | 1/2015 |

OTHER PUBLICATIONS

Extended European Search Report for EP Application No. 18199583.8, dated Mar. 18, 2019 (7 pages).

*Primary Examiner* — Hibret A Woldekidan
(74) *Attorney, Agent, or Firm* — Harness, Dickey & Pierce, P.L.C.

(57) ABSTRACT

A robot includes two links, a joint portion that connects the two links so as to be rotatable relative to each other, a control unit that controls an operation of the joint portion, and an optical transmission device that transmits an optical signal between the two links, and in which the optical transmission device includes an optical wiring that passes through the joint portion and allows the optical signal to propagate, and a light source unit that is disposed on one of the two links and emits the optical signal, and the control unit transmits a signal for adjusting intensity of the optical signal according to a bending amount of the joint portion to the optical transmission device.

6 Claims, 11 Drawing Sheets

(56) References Cited

U.S. PATENT DOCUMENTS

| | | | | |
|---|---|---|---|---|
| 7,168,748 | B2* | 1/2007 | Townsend | B25J 9/1612 |
| | | | | 294/106 |
| 8,052,857 | B2* | 11/2011 | Townsend | B25J 9/1612 |
| | | | | 205/122 |
| 8,805,579 | B2* | 8/2014 | Skrinde | B08B 9/049 |
| | | | | 700/245 |
| 9,427,876 | B2* | 8/2016 | Mozeika | B25J 17/00 |
| 10,065,309 | B2* | 9/2018 | Rose | G01L 1/16 |
| 10,099,390 | B2* | 10/2018 | Okamoto | B25J 19/0037 |
| 10,265,851 | B2* | 4/2019 | Skrinde | B08B 9/049 |
| 2006/0037950 | A1* | 2/2006 | Nihei | B23K 26/0884 |
| | | | | 219/121.78 |
| 2007/0075055 | A1* | 4/2007 | Komatsu | B23K 26/04 |
| | | | | 219/121.63 |
| 2015/0295642 | A1 | 10/2015 | Nikaido et al. | |
| 2018/0031393 | A1* | 2/2018 | Okamoto | B25J 19/025 |
| 2019/0001492 | A1* | 1/2019 | Rose | G01L 1/16 |
| 2019/0079368 | A1* | 3/2019 | Lee | H01S 3/06758 |

* cited by examiner

ROBOT AND OPTICAL TRANSMISSION DEVICE

BACKGROUND

1. Technical Field

The present invention relates to a robot and an optical transmission device.

2. Related Art

An optical transmission device for transmitting an optical signal to an optical wiring is known (for example, refer to JP-A-2015-8380). For example, an optical active cable described in JP-A-2015-8380 includes an optical cable and optical modules respectively provided at both end portions of the optical cable. Each of the optical modules includes a transmission unit that includes a light emitting element and converts an electric signal into an optical signal, a reception unit that includes a light receiving element and converts an optical signal into an electric signal, a light intensity measurement unit that measures light intensity of the light received by the light receiving element of the reception unit, a light intensity transmission and reception unit that transmits light intensity data measured by the light intensity measurement unit to a counterpart optical module and receives the light intensity data transmitted from the counterpart optical module, and a light intensity control unit that controls light intensity of the light emitting element of the transmission unit based on the light intensity data received from the counterpart optical module.

However, since the optical active cable described in JP-A-2015-8380 adjusts light intensity of the light emitting element based on received light intensity at the counterpart, for example, there is a problem that it is difficult to adjust light intensity of the light emitting element when optical signal loss is caused by bending of the optical cable accompanying bending operation of a joint portion in a case of being used in the joint portion of a robot arm.

SUMMARY

An advantage of some aspects of the invention is to provide a robot and an optical transmission device which can exhibit excellent communication performance by using an optical wiring even if the optical wiring is bent.

The invention can be implemented as the following application example or forms.

A robot according to an application example includes two links, a joint portion that relatively connects the two links so as to be rotatable relative to each other, a control unit that controls an operation of the joint portion, and an optical transmission device that transmits an optical signal between the two links, and in which the optical transmission device includes an optical wiring that passes through the joint portion and allows the optical signal to propagate, and a light source unit that is disposed on one of the two links and emits the optical signal, and the control unit transmits a signal for adjusting intensity of the optical signal according to an operation state of the joint portion to the optical transmission device.

According to such a robot, the optical transmission device can adjust intensity of the optical signal according to the operation state of the joint portion based on a signal from the control unit. For that reason, even if the optical wiring is bent, excellent communication performance can be exhibited by using the optical wiring.

In the robot according to the application example, it is preferable that the robot further includes a storing unit that stores information on a relationship between a bending amount of the joint portion and an intensity adjustment amount of the optical signal.

With this configuration, it is possible to enhance responsiveness of intensity adjustment of the optical signal with a relatively simple configuration.

In the robot according to the application example, it is preferable to provide a hand including the two links.

In a case where the optical wiring is provided in a finger portion of the hand, a bending radius of the optical wiring tends to be small. For that reason, light loss due to bending of the optical wiring tends to occur. In such a case, when intensity of the optical signal according to the invention is adjusted, its effect becomes remarkable.

In the robot according to the application example, it is preferable that the control unit includes a computation unit that computes an intensity adjustment amount of the optical signal based on the operation state of the joint portion.

With this configuration, it is easy to enhance accuracy of intensity adjustment of the optical signal.

In the robot according to the application example, it is preferable that the optical transmission device includes a monitor unit that is disposed on the other side of the two links and monitors a light amount of the optical signal propagated through the optical wiring.

With this configuration, even if an operating environment of the robot changes, accuracy of intensity adjustment of the optical signal can be improved.

In the robot according to the application example, it is preferable that the monitor unit is a light receiving element that receives the optical signal propagated through the optical wiring.

With this configuration, the number of components can be reduced.

An optical transmission device according to an application example includes an optical wiring that allows an optical signal to propagate and a light source unit that emits the optical signal, and adjusts intensity of the optical signal according to a predicted bending amount of the optical wiring.

According to such an optical transmission device, by adjusting intensity of the optical signal according to prediction information of a bending amount of the optical wiring, excellent communication performance can be exhibited by using the optical wiring even if the optical wiring is bent.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a robot and an optical transmission device according to the invention will be described in detail based on preferred embodiments illustrated in the accompanying drawings.

First Embodiment

Figure 1:
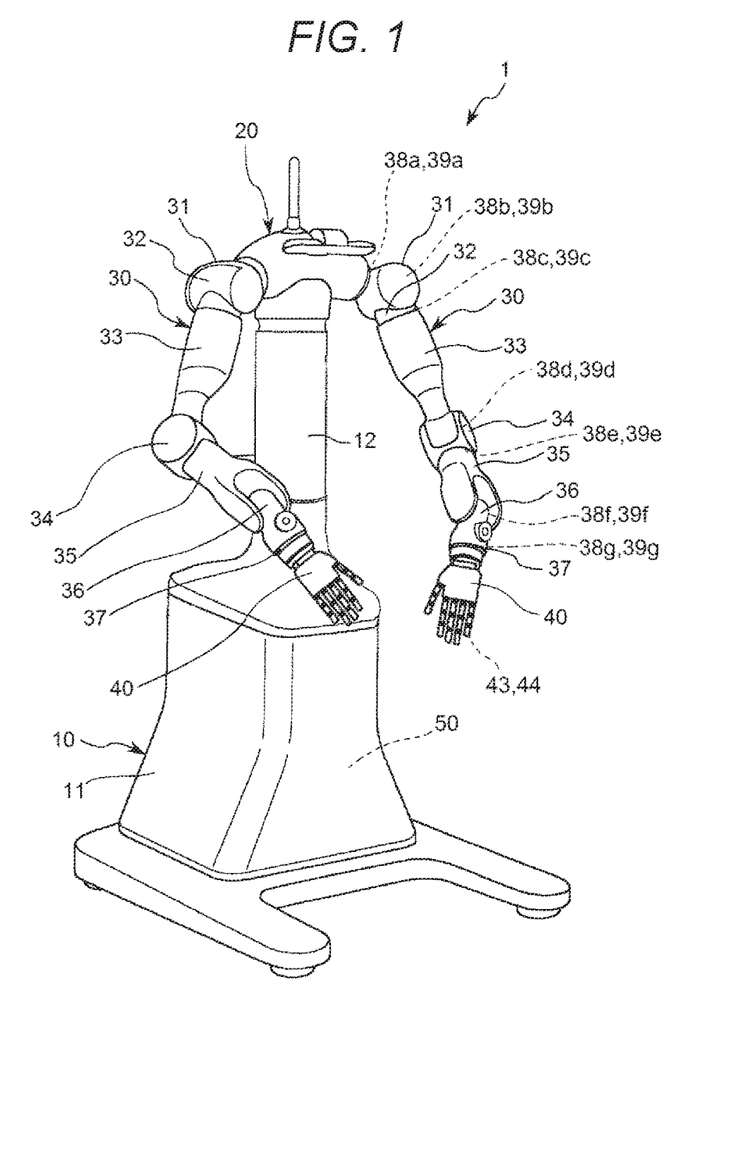
FIG. 1 is a perspective view illustrating a robot according to a first embodiment of the invention.
Figure 2:
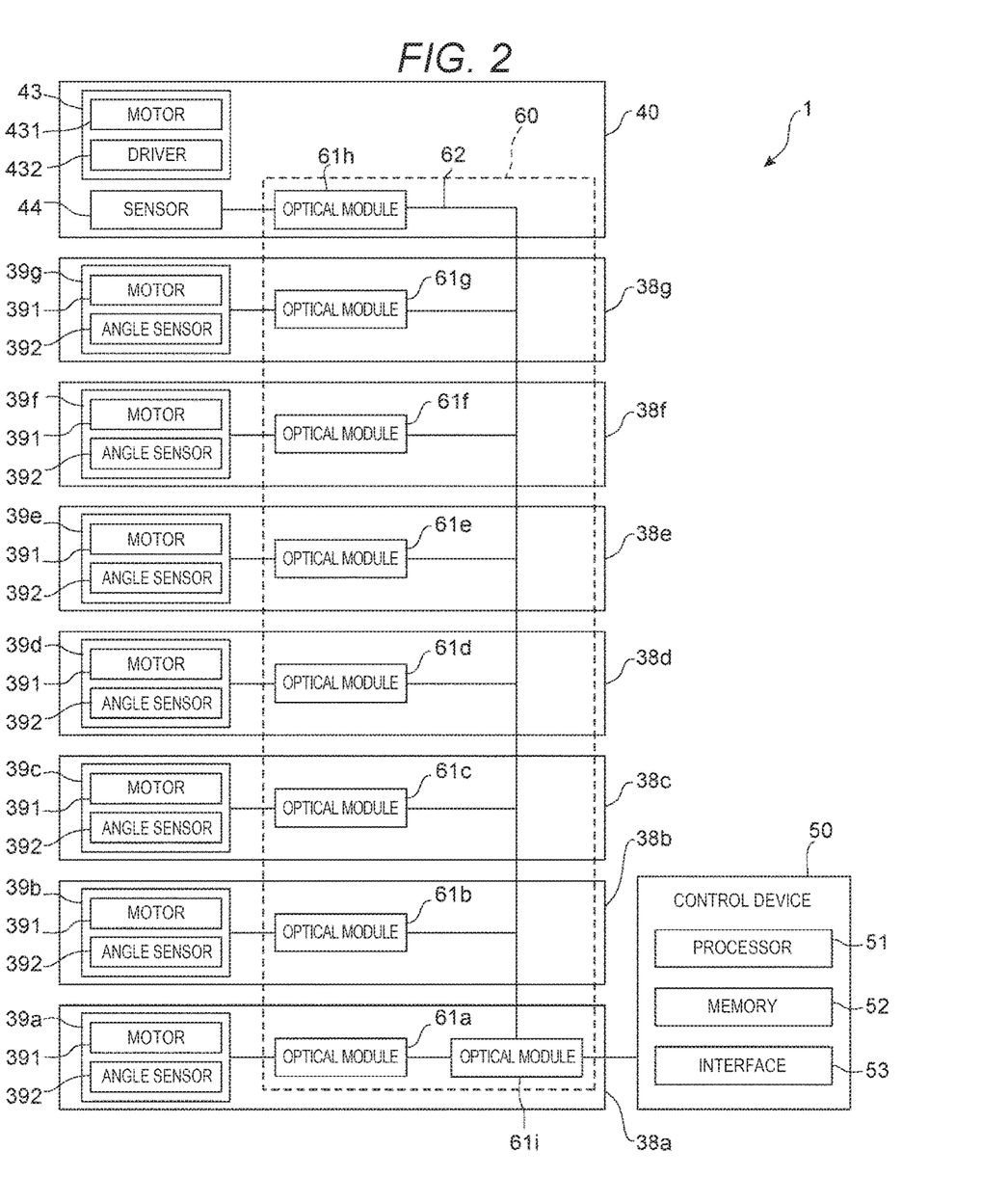
FIG. 2 is a block diagram illustrating a control system of the robot illustrated in FIG. 1.

FIG. 1 is a perspective view illustrating a robot according to a first embodiment of the invention. FIG. 2 is a block diagram illustrating a control system of the robot illustrated in FIG. 1. In the following, for convenience of explanation, the side of the base 10 of the robot 1 will be referred to as a "base end side" and the opposite side (side of the hand 40) thereof will be referred to as the "tip end side".

Robot

A robot 1 illustrated in FIG. 1 is a so-called double-arm robot, for example, that can perform work such as feeding, removing material, transporting and assembling precision instruments and components (targets) constituting the robot 1. The robot 1 includes a base 10, a body portion 20 supported by the base 10, two robot arms 30 connected to the left and right of the body portion 20, a hand 40 connected to the tip end portion of each robot arm 30, a control device 50 for controlling each unit of the robot 1, and an optical transmission device 60 (see FIG. 2) for performing optical transmission in the robot 1. The robot has main characteristics in adjusting intensity of an optical signal of the optical transmission device 60. Prior to the description thereof, first, outline of each unit of the robot 1 will be described.

The base 10 includes a support portion 11 fixed to a floor, a wall, a ceiling and a movable carriage, and the like, and a pillar portion 12 supported by the support portion 11. The body portion 20 is connected to an upper portion of the pillar portion 12. A pair of robot arms 30 is connected to both sides of the body portion 20.

Each robot arm 30 includes an arm 31 (link), an arm 32 (link), an arm 33 (link), an arm 34 (link), an arm (link), an arm 36 (link), and an arm 37 (link), which are connected in this order from the base end side to the tip end side. Here, the arm 31 is rotatably connected to the body portion 20 (link) via a joint portion 38a. The arm 32 is rotatably connected to the arm 31 via a joint portion 38b. The arm 33 is rotatably connected to the arm via a joint portion 38c. The arm 34 is rotatably connected to the arm 33 via a joint portion 38d. The arm 35 is rotatably connected to the arm 34 via a joint portion 38e. The arm 36 is rotatably connected to the arm 35 via the joint portion 38f. The arm 37 is rotatably connected to the arm 36 via a joint portion 38g.

A hand 40 is attached to the arm 36 of each robot arm 30 as described above. The hand 40 is a multi-fingered hand and is configured to be able to grip a target. The hand 40 will be described in detail later, together with a description of intensity adjustment of the optical signal of the optical transmission device 60. The hand 40 may be connected to the arm 36 via a force sensor or the like. Further, the multi-fingered hand is a hand having a plurality of fingers with joints.

As illustrated in FIG. 2, the robot 1 further includes drive units 39a to 39g for driving joint portions 38a to 38g, a drive unit 43 for driving the hand 40, a sensor 44 provided in the hand 40. Necessary electrical communication or power supply is performed to the drive units 39a to 39g, and 43 and the sensor 44 through an electrical wiring (not illustrated).

The drive unit 39a is provided in the joint portion 38a described above and rotates the arm 31 with respect to the body portion 20. Similarly, the drive units 39b to 39g are respectively provided in the joint portions 38b to 38g described above and rotate the arms 32 to 37, respectively. Each of The drive units 39a to 39g is configured to include a motor 391, an angle sensor 392, and a reduction gear (not illustrated).

The motor 391 is, for example, a servo motor such as an AC servo motor or a DC servo motor, and generates a driving force for rotating each of the arms 31 to 37 described above. The angle sensor 392 is, for example, a magnetic type or an optical type rotary encoder, and detects a rotation state (for example, rotation angle) of a corresponding joint portion.

The drive unit 43 is provided in the hand 40 and drives the hand 40. The drive unit 43 is configured to include a motor 431 and a driver 432. The motor 431 is, for example, a piezoelectric motor and drives a finger portion 42 of the hand 40 which will be described later. The driver 432 is a circuit for driving the motor 431, and inputs a predetermined drive signal to the motor 431.

The sensor 44 is provided in the hand 40 (in the first embodiment, tip end portion of the finger portion 42 which will be described later). The sensor 44 is not particularly limited, but examples thereof include an imaging element, a depth sensor, a tactile sensor, a pressure sensor, an encoder, and the like. An installation position of the sensor 44 is not limited to the finger portion 42, and may be provided in a palm portion 41 described later.

As illustrated in FIG. 2, the optical transmission device 60 includes optical modules 61a to 61i and an optical wiring 62. The optical module 61a is electrically (electrically conductively) connected to the drive unit 39a (for example, angle sensor 392) described above and has a function (transmission function) of converting an electric signal (for example, signal related to angle information) from the drive unit 39a into an optical signal and outputting the optical signal. Similarly, the optical modules 61b to 61g are electrically (electrically conductively) connected to the drive units 39b to 39g (for example, angle sensor 392), respectively, and each of which has a function of converting each of electrical signals (for example, signals related to angle information) from the drive units 39b to 39g into an optical signal and outputting the optical signal. The optical module 61h is connected (electrically conductively) to the sensor 44 described above, and has a function (transmission function) of converting an electric signal from the sensor 44 into an optical signal and outputting the optical signal. The optical module 61i is connected to the optical modules 61a to 61h via the optical wiring 62, and has a function (reception function) for converting the optical signals from the optical modules 61a to 61h into electrical signals and outputting the electrical signals to the control device 50.

Each of the optical modules 61a to 61h may have the reception function, and the optical module 61i may have a transmission function. In this case, the electrical signal from the control device 50 can be converted into an optical signal by the optical module 61h and output to the optical modules 61a to 61h, and the optical signals from the optical module 61i can be converted into electrical signals by the optical modules 61a to 61h and output to the drive units 39a to 39g and 43. With this, it is possible to perform drive control of the drive units 39a to 39g and 43 using optical communication.

Each of the optical modules 61a to 61i is configured to include, for example, an optical transmission subassembly (TOSA: Transmitting Optical Sub-Assembly) and a light receiving subassembly (ROSA: Receiving Optical Sub-Assembly). The optical modules 61a to 61i may have different configurations, but the optical modules 61a to 61i may have the same configuration. The configuration of the optical modules 61h and 61i will be described in detail later, together with a description of intensity adjustment of the optical signal of the optical transmission device 60 to be described later.

The optical wiring 62 connects the optical modules 61a to 61h and the optical module 61i so as to enable optical communication with each other. The optical wiring 62 is routed from the body portion 20 to the hand 40 through the inside of the robot arm 30. Accordingly, the optical wiring 62 passes through the inside of each of the joint portions 38a to 38g and the hand 40 (more specifically, joint portions 424 to 426 of finger portion 42 described later) described above. Such an optical wiring 62 is configured to have, for example, an optical fiber and an optical waveguide. An optical coupler, an optical switch, or the like may be provided in the optical wiring 62 as necessary. Although the optical wiring 62 is branched halfway and connected to the optical modules 61a to 61h in the figure, the invention is not limited thereto, and each of the optical modules 61a to 61h may be connected to the optical module 61i with individual optical wiring.

The control device 50 illustrated in FIGS. 1 and 2 has a function of controlling driving of each unit of the robot 1. In particular, the control device 50 has a function of controlling the operation of the optical transmission device 60 so as to adjust intensity of an optical signal of the optical transmission device 60, which will be described in detail later. The control device 50 includes a processor 51 such as a central processing unit (CPU), a memory 52 such as a read only memory (ROM) and a random access memory (RAM), and an interface 53. Then, the control device 50 reads and executes the program stored in the memory 52 as needed to realize processing such as control of the operation of the robot 1, various computations and determinations.

Although the control device 50 is disposed in the base 10 of the robot 1 in the figure, the invention is not limited thereto, and for example, the control device 50 may be disposed in the body portion 20, or may be disposed outside the base 10 and the body portion 20. Further, a display device including a monitor such as a display, and an input device including, for example, a mouse, a keyboard, or the like may be connected to the control device 50.

The outline of each unit of the robot 100 has been described above. Hereinafter, intensity adjustment of the optical signal of the optical transmission device 60 will be described in detail. In the following description, optical transmission between the optical modules 61h and 61i will be representatively described.

Intensity Adjustment of Optical Signal of Optical Transmission Device

Figure 3:
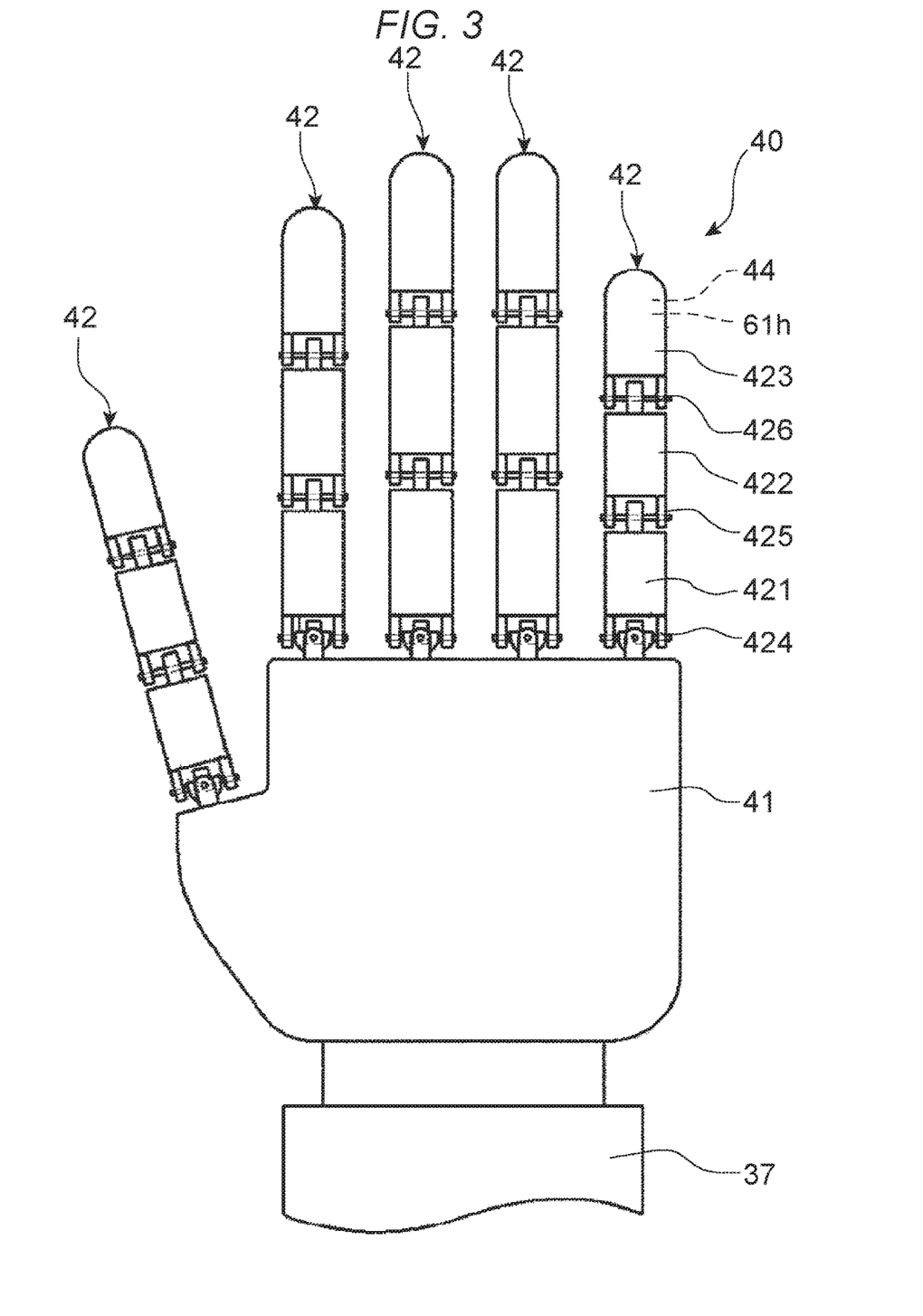
FIG. 3 is a front view illustrating a hand of the robot illustrated in FIG. 1.
Figure 4:
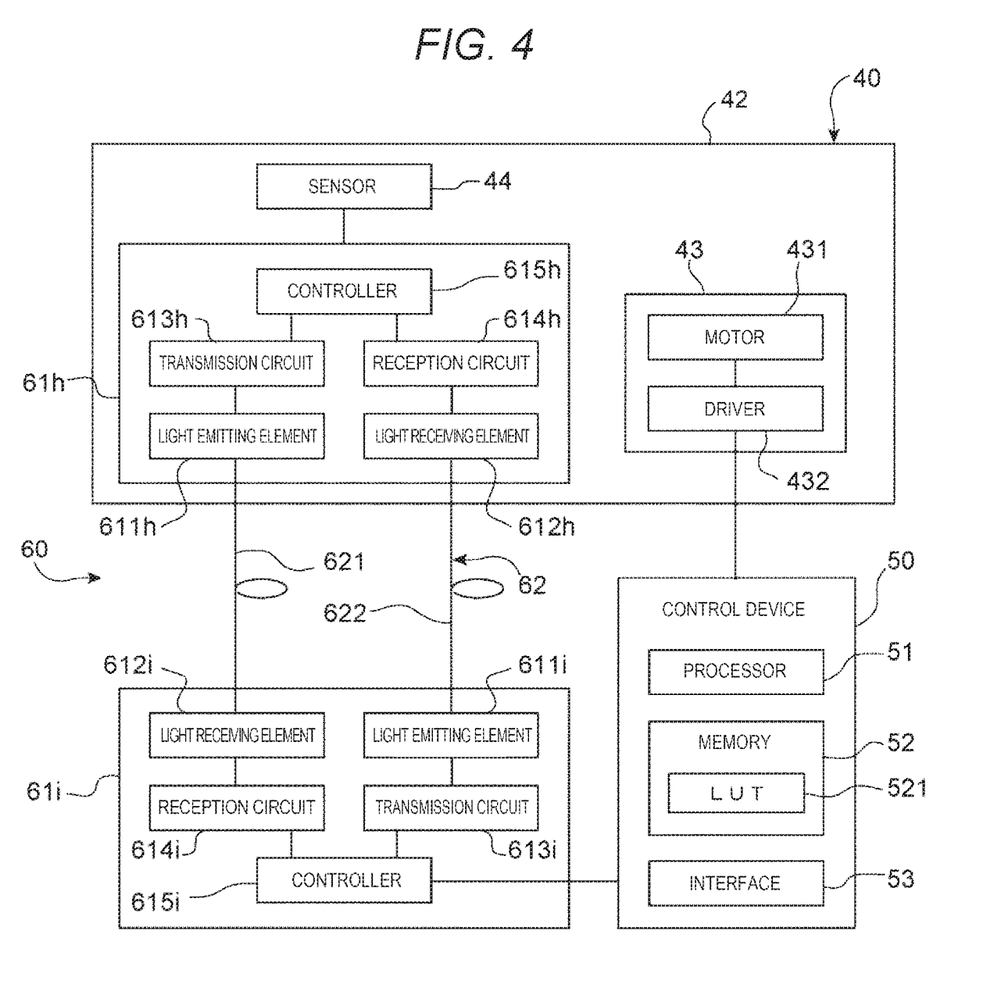
FIG. 4 is a block diagram illustrating a configuration of an optical transmission device and a control device illustrated in FIG. 2.
Figure 5:
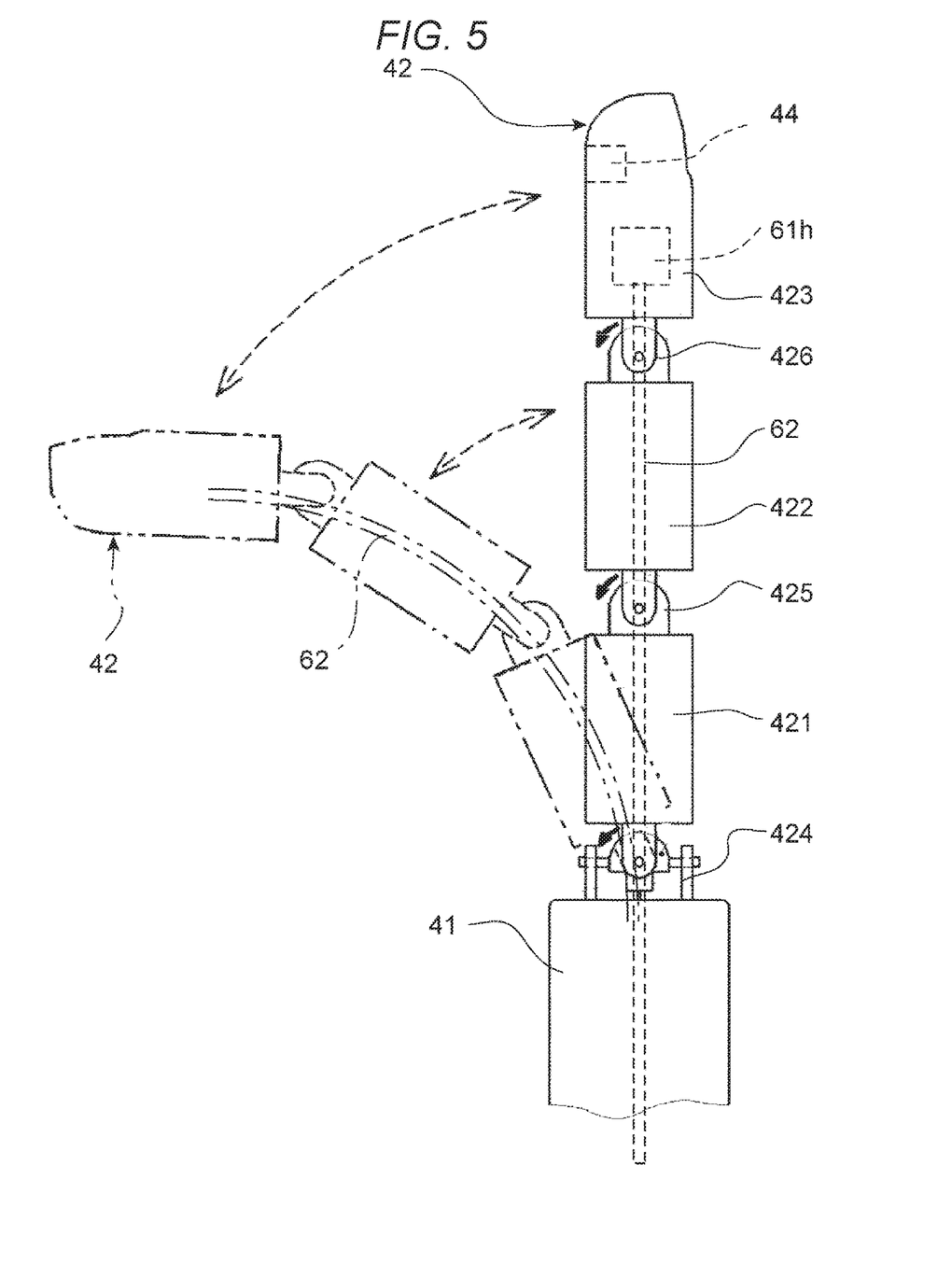
FIG. 5 is a side view illustrating fingers (a plurality of links) included in the hand illustrated in FIG. 3.
Figure 6:
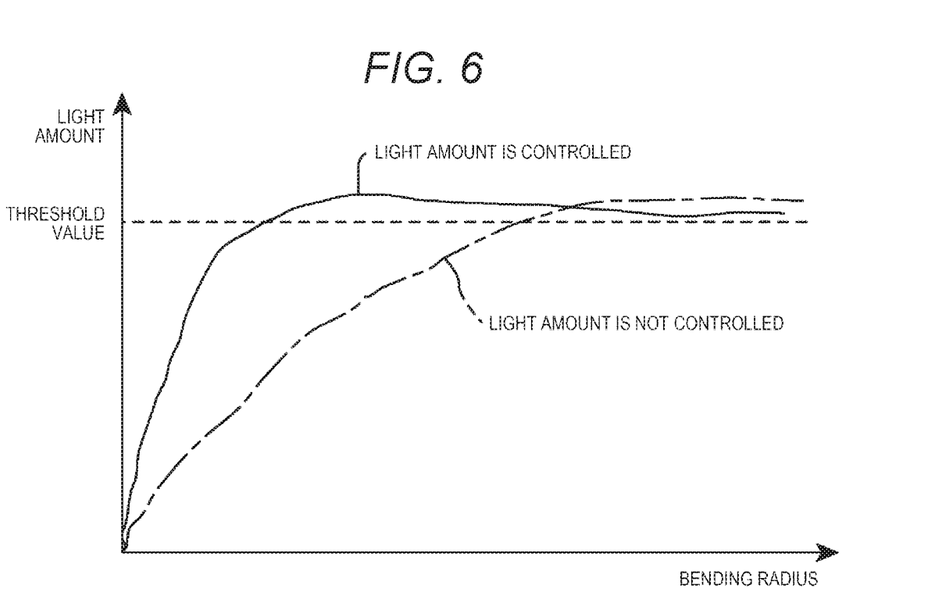
FIG. 6 is a graph illustrating a relationship between a bending radius of an optical wiring and a light amount.
Figure 7:
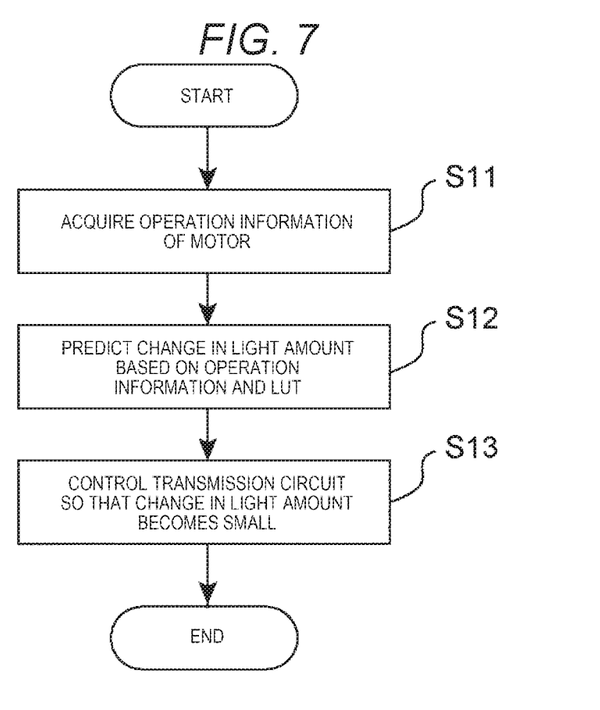
FIG. 7 is a flowchart illustrating intensity adjustment of an optical signal according to the first embodiment of the invention.

FIG. 3 is a front view illustrating the hand included in the robot illustrated in FIG. 1. FIG. 4 is a block diagram illustrating a configuration of the optical transmission device and the control device illustrated in FIG. 2. FIG. 5 is a side view illustrating a finger (plurality of links) included in the hand illustrated in FIG. 3. FIG. 6 is a graph illustrating a relationship between a bending radius of the optical wiring and a light amount. FIG. 7 is a flowchart illustrating intensity adjustment of the optical signal according to the first embodiment of the invention. In FIG. 4, for convenience of explanation, the configuration of a portion of one finger portion 42 included in the hand 40 is representatively illustrated.

As illustrated in FIG. 3, the hand 40 includes a palm portion 41 connected to the arm 37 and five finger portions 42 connected to the palm portion 41, and is configured to allow an action similar to a human hand. Here, each finger portion 42 has a link 421, a link 422, and a link 423, which are connected in this order from the base end side to the tip end side. Here, the link 421 is rotatably connected to the palm portion 41 (link) via the joint portion 424. The link 422 is rotatably connected to the link 421 via the joint portion 425. The link 423 is rotatably connected to the link 422 via the joint portion 426. Each of the joint portions 424 to 426 is configured such that the finger portion 42 is bent toward the palm portion 41 side (see FIG. 5).

The sensor 44 and the optical module 61h are disposed on the link 423 on the most tip end side of at least one finger portion 42 of such a hand 40. Although not illustrated, a drive unit 43 for driving the respective joint portions 424 to 426 is disposed on the finger portions 42. The drive unit 43 independently drives each finger portions 42. However, the drive unit 43 may drive (for example, interlocking) the finger portions 42 with a certain relationship.

As illustrated in FIG. 4, the optical module 61h includes a light emitting element 611h, a light receiving element 612h, a transmission circuit 613h, a reception circuit 614h, and a controller 615h.

The light emitting element 611h is, for example, a semiconductor laser, a light-emitting diode, or the like, and emits light by energization (drive signal). The light receiving element 612h is, for example, a photodiode, and outputs a current signal corresponding to the received light amount by receiving light. The transmission circuit 613h is configured to include, for example, a driver for driving the light emitting element 611h, and inputs a drive signal (more specifically, a signal obtained by superimposing an AC voltage on a DC voltage) for driving the light emitting element 611h to the light emitting element 611h. The reception circuit 614h is configured to include, for example, an amplification circuit, a demodulation circuit, a current-voltage conversion circuit, and the like, and converts a current signal from the light receiving element 612h into a predetermined voltage signal. The controller 615h is configured by, for example, an application specific integrated circuit (ASIC) or a field-programmable gate array (FPGA), and performs operation control of each unit of the optical module 61h and various processing.

Such an optical module 61h is connected to the optical module 61i so as to enable optical communication via the optical wiring 62. The optical module 61i has the same configuration as the optical module 61h. That is, the optical module 61i includes a light emitting element 611i, a light receiving element 612i, a transmission circuit 613i, a reception circuit 614i, and a controller 615i.

The light emitting element 611i is, for example, a semiconductor laser, a light-emitting diode, or the like, and emits light by energization (drive signal). The light receiving element 612i is, for example, a photodiode, and outputs a current signal corresponding to the received light amount by receiving light. The transmission circuit 613$i$ is configured to include, for example, a driver for driving the light emitting element 611$i$, and inputs a drive signal (more specifically, a signal obtained by superimposing an AC voltage on a DC voltage) for driving the light emitting element 611$i$ to the light emitting element 611$i$. The reception circuit 614$i$ is configured to include, for example, an amplification circuit, a demodulation circuit, a current-voltage conversion circuit, and the like, and converts a current signal from the light receiving element 612$i$ into a predetermined voltage signal. The controller 615$i$ is configured by, for example, an application specific integrated circuit (ASIC) or a field-programmable gate array (FPGA), and performs operation control of each unit of the optical module 61$i$ and various processing.

The optical wiring 62 includes two optical wirings 621 and 622. The optical wiring 621 connects the light emitting element 611$h$ of the optical module 61$h$ and the light receiving element 612$i$ of the optical module 61$i$ so as to allow optical communication. With this, it is possible to perform optical transmission (transmission of optical signals) from the optical module 61$h$ to the optical module 61$i$ via the optical wiring 621. The optical wiring 622 connects the light receiving element 612$h$ of the optical module 61$h$ and the light emitting element 611$i$ of the optical module 61$i$ so as to enable optical communication. With this, it is possible to perform optical transmission (transmission of optical signals) from the optical module 61$i$ to the optical module 61$h$ via the optical wiring 622.

As illustrated in FIG. 5, the optical wiring 62 has a portion that is disposed inside the finger portion 42 and passes through the joint portions 424 to 426. Accordingly, as the joint portions 424 to 426 of the finger portion 42 are bent, the relevant portion of the optical wiring 62 is bent. Here, when the optical wiring 62 (for example, optical fiber) is bent, the optical signal propagating in the optical wiring 62 leaks to the outside. In particular, a leakage amount of such an optical signal exponentially increases as the bending radius of the optical wiring 62 decreases. For that reason, in a case where intensity of the optical signal input to the optical wiring is constant, the light amount of the optical signal propagated through the optical wiring 62 sharply decreases as the bending radius of the optical wiring 62 decreases, as indicated by a one-dotted chain line (no light amount control) in FIG. 6.

In particular, in the joint portions 424 to 426 of the finger portion 42, since the bending radius of the optical wiring 62 tends to be smaller than the other joint portions of the robot arm 30, the loss of the optical signal at the optical wiring 62 tends to be larger. When the loss of the optical signal at the optical wiring 62 becomes too large, intensity of the optical signal propagated through the optical wiring 62 becomes lower than the threshold (lower limit) at which optical communication is possible, and there is a concern that an error occurs in optical communication between the optical modules 61$h$ and 61$i$.

Accordingly, in the robot 1, intensity of the optical signals output from the optical modules 61$h$ and 61$i$ is adjusted according to the bending amount (degree of bending) of the optical wiring 62, for example, a bending radius. With this, even if the optical wiring 62 passes through the joint portions 424 to 426, it is possible to reduce that intensity of the optical signal propagated through the optical wiring 62 falls below a threshold value (lower limit) at which optical communication is possible, as indicated by the solid line in FIG. 6 (light amount is controlled). Hereinafter, intensity adjustment of the optical signal in the optical module 61$i$ will be representatively described. The intensity adjustment of the optical signals in the optical modules 61$a$ to 61$h$ can be performed similarly to intensity adjustment of the optical signal in the optical module 61$i$.

In the memory 52 of the control device 50 according to the first embodiment, information on the relationship between the bending amount (bending angle), which is the operating state of the joint portions 424 to 426, and the bending amount of the optical wiring 62 and a look up table (LUT) 521 as information on the relationship between the bending amount of the optical wiring 62 and an intensity adjustment amount of the optical signal from the light emitting element 611$i$ are stored. Then, the control device 50 acquires operation information of the joint portions 424 to 426 and performs intensity adjustment of the optical signal from the light emitting element 611$i$ using the acquired operation information and the LUT 521 stored in the memory 52.

More specifically, as illustrated in FIG. 7, first, the control device 50 acquires operation information of the motor 431 (step S11). This operation information is information corresponding to the bending amount of the joint portions 424 to 426, and can be obtained from a control signal for controlling the driver 432, for example, and is information predicting the bending amount of the joint portions 424 to 426. A sensor (for example, a rotary encoder) for detecting the operation state of the joint portions 424 to 426 may be provided, and operation information of the joint portions 424 to 426 may be obtained using the detection result of the sensor.

Next, based on the acquired operation information and the LUT 521 of the memory 52, the control device 50 predicts a light amount change of the light signal from the light emitting element 611$i$ and determines the intensity adjustment amount (step S12). Here, for example, the LUT 521 stored in the memory 52 operates the finger portion 42, can be obtained by acquiring a relationship between the operation state (bending amount) of the joint portions 424 to 426 and the amount of received light (attenuation amount of the optical signal) at the light receiving element 612$h$ and using the relationship while monitoring the light amount received by the light receiving element 612$h$ in a state in which light emission intensity of the light emitting element 611$i$ is kept constant in advance.

Thereafter, the control device 50 inputs the signal of information on the determined intensity adjustment amount to the controller 615$i$ of the optical module 61$i$, and controls the transmission circuit 613$i$ so that change in the light amount becomes small (step S13). Specifically, as the bending amount of the joint portions 424 to 426 increases, that is, as the bending radius of the optical wiring 62 decreases, light emission intensity of the light emitting element 611$i$ increases. On the other hand, as the bending amount of the joint portions 424 to 426 decreases, that is, as the bending radius of the optical wiring 62 increases, the light emission intensity of the light emitting element 611$i$ decreases.

Here, the light emitting element 611$i$ drives by receiving a drive signal from the transmission circuit 613$i$. The drive signal is, for example, a signal (signal having a DC component and an AC component) obtained by superimposing a DC voltage (bias current) and an AC voltage (modulation current). When adjusting light emission intensity of the light emitting element 611$i$, it is preferable that the light emitting element 611$i$ is driven by adjusting (increasing or decreasing) both the DC component and the AC component of the drive signal, that is, adding a voltage value corresponding to the intensity adjustment amount described above to the DC component and the AC component of the drive signal. With this, even if the light emission intensity of the light emitting element 611i is adjusted, good communication can be ensured.

As described above, the robot 1 includes the joint portions 424 to 426 connecting two links among the palm portion 41 (link) and the links 421 to 423 in a relatively rotatable manner, the control device 50 which is a control unit for controlling the operation of the joint portions 424 to 426, and the optical transmission device 60 that transmits optical signals between the two links among the palm portion 41 (link) and the links 421 to 423. The optical transmission device 60 includes the optical wiring 62 which is disposed to pass through the joint portions 424 to 426 and propagates an optical signal and a light emitting element 611i which is disposed on one side of the two links among the palm portion 41 (link) and the links 421 to 423 and is a light source portion for emitting an optical signal. In particular, the control device 50 (control unit) transmits a signal for adjusting intensity of the optical signal to the optical transmission device 60 according to the operation state of the joint portions 424 to 426.

Here, the optical transmission device 60 includes the optical wiring 62 for propagating the optical signal and the light emitting element 611i as the light source portion for emitting the optical signal, and can also be said to be a device for adjusting intensity of an optical signal in accordance with the predicted bending amount of the optical wiring 62.

According to such a robot 1, the optical transmission device 60 can adjust intensity of the optical signal according to the operation state of the joint portions 424 to 426 based on the signal from the control device 50. For that reason, even if the optical wiring 62 is bent, excellent communication performance can be exhibited by using the optical wiring 62. In addition, it is not necessary to use expensive optical fibers with little loss due to bending for the optical wiring 62, and cost reduction of the optical transmission device 60 can be achieved. Since intensity adjustment of the optical signal is performed in advance using operation information of the joint portions 424 to 426, which is an example of information predicting the bending amount (for example, bending radius) of the optical wiring 62, there is also an advantage that responsiveness of the intensity adjustment of the optical signal can be enhanced as compared with the case where the intensity adjustment (feedback control) of the optical signal is performed based on intensity of the optical signal output from the optical wiring 62.

Here, the robot 1 includes the hand 40 including the finger portion 42 including two links among the links 421 to 423. In a case where the optical wiring 62 is provided in the finger portion 42 of the hand 40, the bending radius of the optical wiring 62 tends to be small. For that reason, light loss due to bending of the optical wiring 62 tends to occur. In such a case, when the intensity of the optical signal according to the invention is adjusted, its effect becomes remarkable.

In the robot 1, the intensity adjustment amount of the optical signal may be determined based on a drive states of one joint portion or may be determined based on driving states of a plurality of joint portions. In the case where the optical wiring 62 passes through the plurality of joints, there is a concern that loss of the light amount accompanying the bending of the joint is increased and the robot 1 may malfunction and thus, in such a case, when intensity adjustment of the optical signal according to the invention is performed, the effect thereof becomes remarkable.

The robot 1 according to the embodiment includes the memory 52, which is a storing unit that stores the LUT 521, which is information on the relationship between the bending amounts of the joint portions 424 to 426 and the intensity adjustment amount of the optical signal. Then, the control device 50 (control unit) adjusts the intensity of the optical signal using operation information of the joint portions 424 to 426 and the LUT 521. With this, it is possible to enhance responsiveness of the intensity adjustment of the optical signal with a relatively simple configuration.

Second Embodiment

Next, a second embodiment of the invention will be described.

Figure 8:
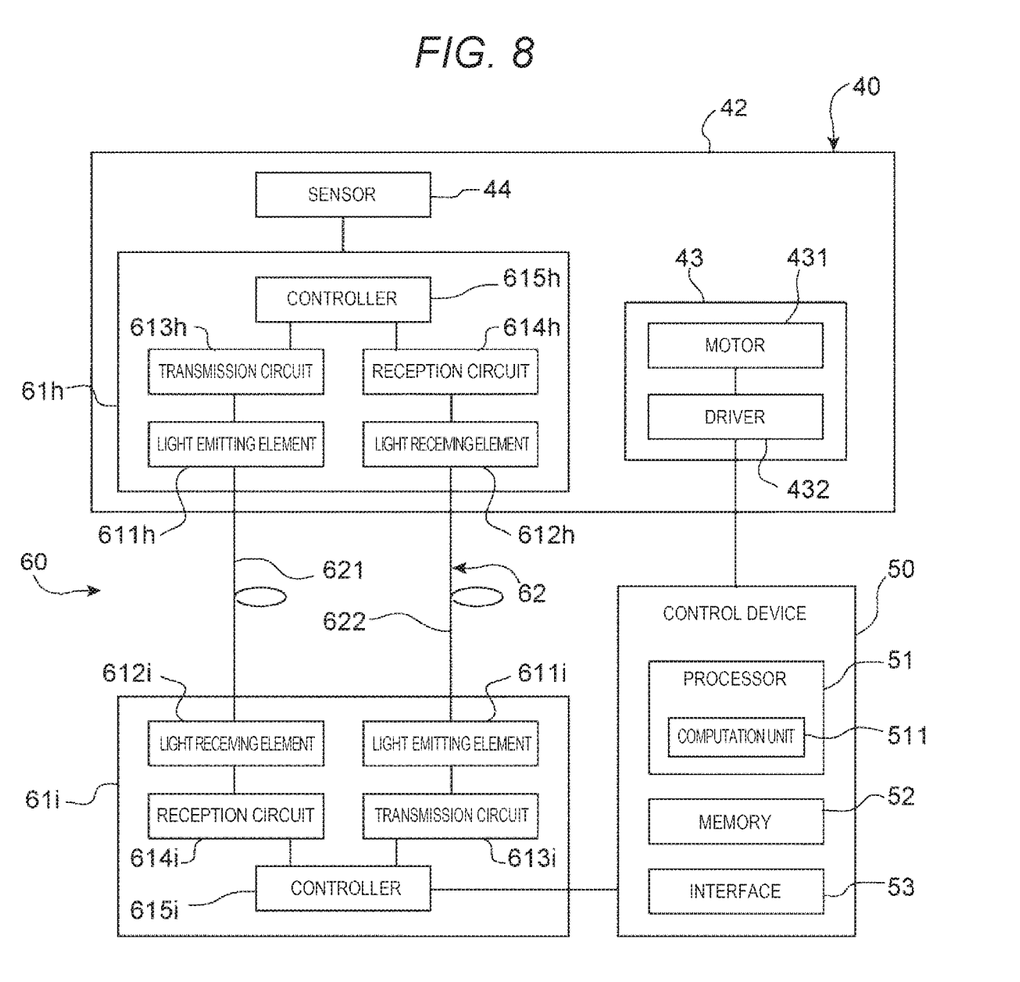
FIG. 8 is a block diagram illustrating a configuration of an optical transmission device and a control device of a robot according to a second embodiment of the invention.
Figure 9:
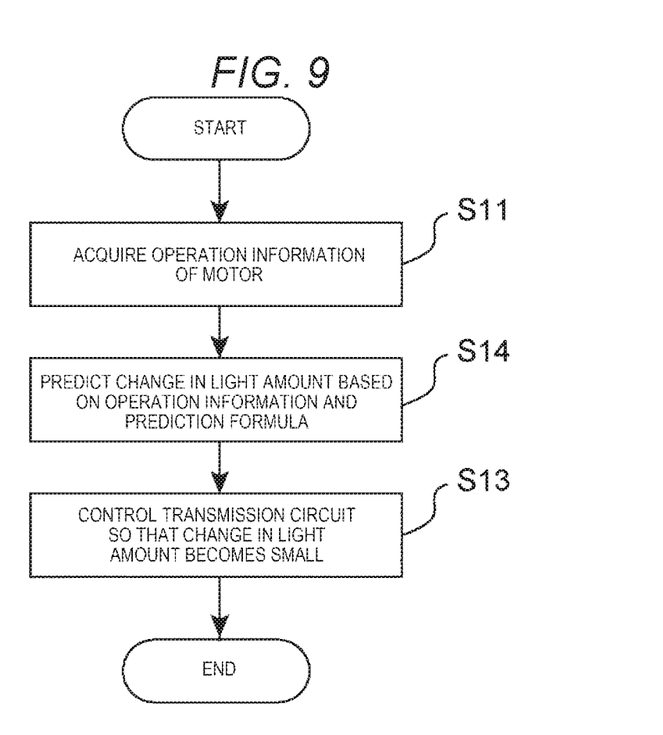
FIG. 9 is a flowchart illustrating intensity adjustment of an optical signal according to the second embodiment of the invention.

FIG. 8 is a block diagram illustrating a configuration of an optical transmission device and a control device of a robot according to the second embodiment of the invention. FIG. 9 is a flowchart illustrating intensity adjustment of the optical signal in the second embodiment of the invention.

The embodiment is the same as the first embodiment described above except that a method of adjusting intensity of the optical signal of the optical transmission device is different. In the following description, description of the embodiment will be made mainly on differences from the first embodiment described above, and description of similar matters will be omitted.

The processor 51 of the control device 50 of the embodiment illustrated in FIG. 8 includes a computation unit 511 for computing the intensity adjustment amount of the optical signal from the light emitting element 611i based on the operation states of the joint portions 424 to 426. Such a control device 50 acquires operation information of the joint portions 424 to 426, computes the intensity adjustment amount of the optical signal from the light emitting element 611i based on the acquired operation information, and adjusts intensity of the optical signal from the light emitting element 611i using the computation result.

More specifically, as illustrated in FIG. 9, first, the control device 50 executes step S11 as in the first embodiment described above.

Next, the control device 50 (computation unit 511) predicts change in a light amount of the optical signal from the light emitting element 611i based on the acquired operation information and computes the intensity adjustment amount (step S14). Here, the computation unit 511 performs computation using a relational expression between the bending amount of the joint portions 424 to 426 and the intensity adjustment amount of the optical signal from the light emitting element 611i. Such a relational expression can be determined based on, for example, prior experiments, optical fiber catalog, literature, and the like.

Thereafter, similarly to the first embodiment, the control device 50 executes step S13.

As described above, the control device 50 (control unit) of the embodiment includes the computation unit 511 that computes the intensity adjustment amount of the optical signal based on the operation state of the joint portions 424 to 426. With this, resolution of the intensity adjustment of the optical signal can be enhanced, and as a result, it is easy to enhance accuracy of the intensity adjustment of the optical signal.

According to the second embodiment as described above, the same effects as those of the first embodiment described above can be exhibited.

Third Embodiment

Next, a third embodiment of the invention will be described.

Figure 10:
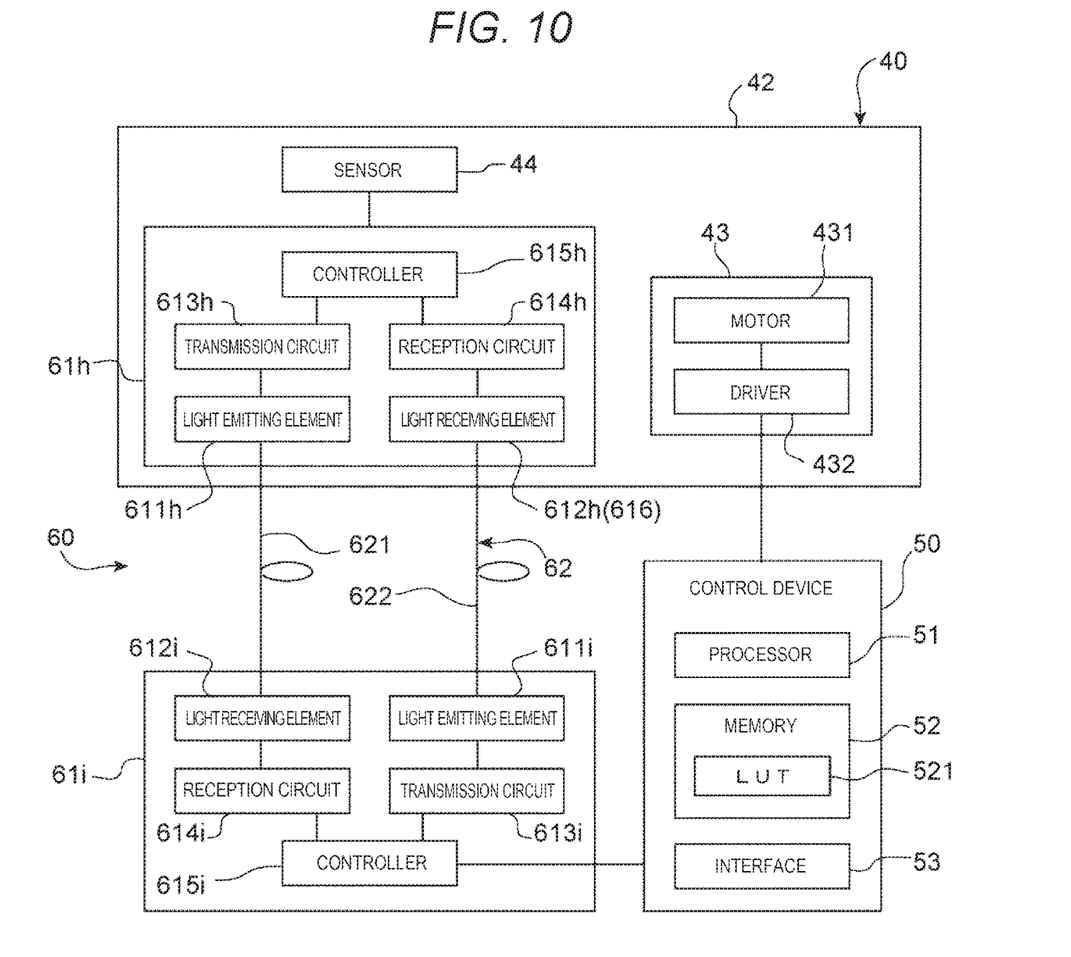
FIG. 10 is a block diagram illustrating a configuration of an optical transmission device and a control device of a robot according to a third embodiment of the invention.
Figure 11:
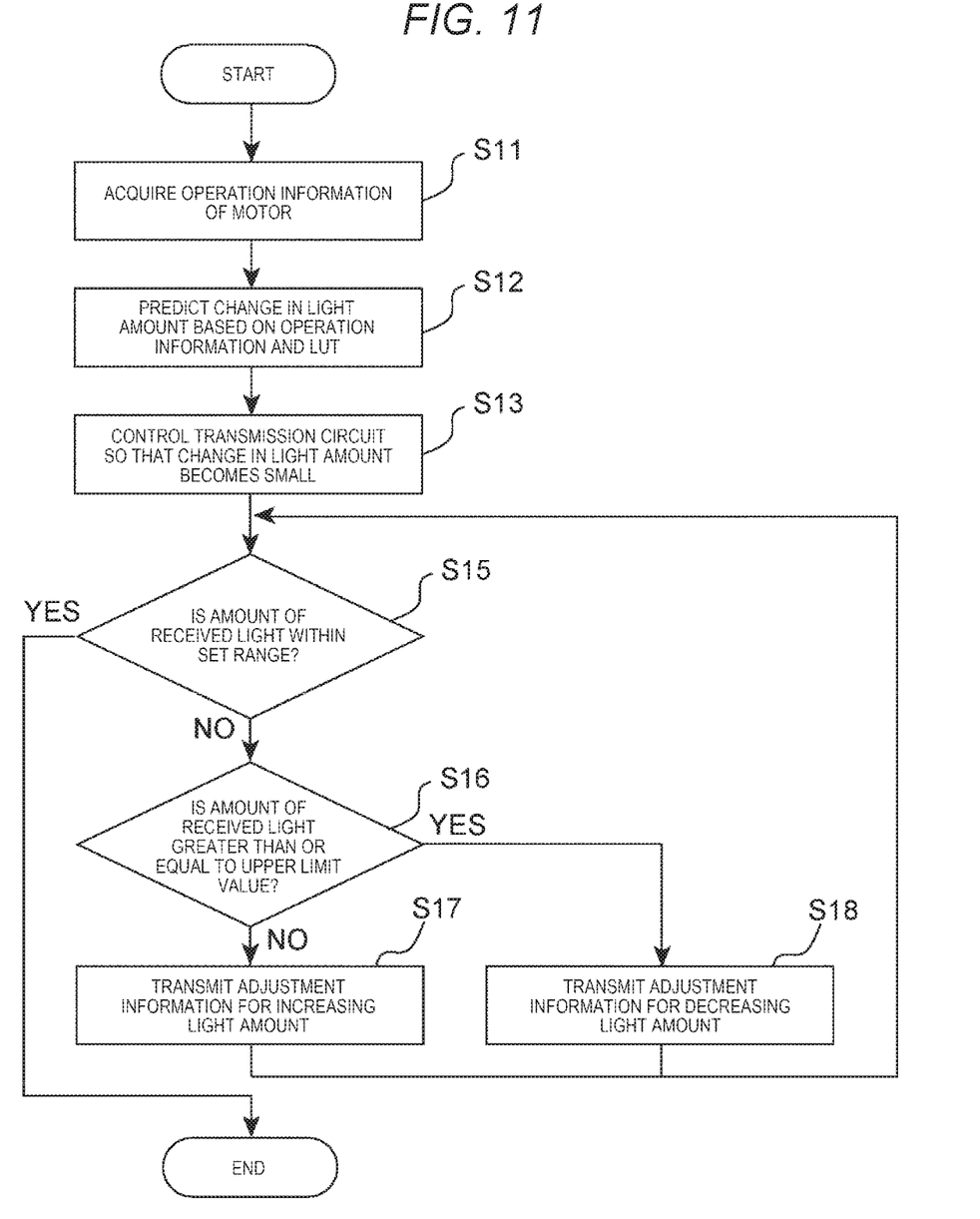
FIG. 11 is a flowchart illustrating intensity adjustment of an optical signal according to the third embodiment of the invention.

FIG. 10 is a block diagram illustrating a configuration of an optical transmission device and a control device of a robot according to a third embodiment of the invention. FIG. 11 is a flowchart illustrating intensity adjustment of the optical signal in the third embodiment of the invention.

The embodiment is the same as the first embodiment described above, except that the method of adjusting the intensity of the optical signal of the optical transmission device is different. In the following description, description of the embodiment will be made mainly on differences from the first embodiment described above, and description of similar matters will be omitted.

In the embodiment, in addition to the intensity adjustment of the optical signal of the first embodiment described above, the optical module 61i adjusts intensity of the optical signal from the light emitting element 611i based on the light amount received by the light receiving element 612h of the optical module 61h. That is, the light receiving element 612h constitutes a monitor unit 616 which monitors intensity of the optical signal from the light emitting element 611i.

More specifically, as illustrated in FIG. 11, first, the control device 50 executes steps S11 to S13 as in the first embodiment described above.

Then, the controller 615h of the optical module 61h determines whether or not the light amount received by the monitor unit 616 is within a set range (step S15). In a case where it is determined that the light amount received by the monitor unit 616 is within the set range (YES in step S15), processing is ended. On the other hand, in a case where it is determined that the light amount received by the monitor unit 616 is not within the set range (NO in step S15), the controller 615h determines whether or not the light amount received by the monitor unit 616 exceeds the upper limit value (step S16).

In a case where it is determined that the light amount received by the monitor unit 616 does not exceed the upper limit value (NO in step S16), the received light amount is lower than the lower limit value within the set range, the controller 615h drives the light emitting element 611h to transmit adjustment information for increasing the light amount to the optical module 61i in order to adjust matters that the received light amount becomes lower than the lower limit value (step S17). Then, processing proceeds to step S15 described above.

On the other hand, in a case where it is determined that the light amount received by the monitor unit 616 exceeds the upper limit value (YES in step S16), the controller 615h drives the light emitting element 611h to transmit adjustment information for decreasing the light amount to the optical module 61i (step S18) in order to adjust matters that the light amount received exceeds the upper limit value. Then, processing proceeds to step S15 described above.

Such steps S17 and S18 are repeated until the light amount received by the monitor unit 616 is within the set range in step S15.

Although the light receiving element 612h is used as the monitor unit 616 in the embodiment, the invention is not limited thereto, and a sensor separate from the light receiving element 612h may be used as the monitor unit 616 to monitor intensity of the optical signal from the light emitting element 611i. Further, the optical module 61i may transmit adjustment information received from the optical module 61h to the control device 50 and adjust (update) the LUT 521 of the control device 50.

As described above, the optical transmission device 60 of the embodiment includes a monitor unit 616 (light receiving element 612h) which is disposed on the other side (link 423 in the embodiment) of the two links among the palm portion 41 (link) and the links 421 to 423 and is for monitoring the light amount of the optical signal propagated through the optical wiring 62. With this, even if an operation environment of the robot 1 changes, accuracy of the intensity adjustment of the optical signal can be improved.

Here, the monitor unit 616 is a light receiving element 612h for receiving the optical signal propagated through the optical wiring 62. With this, it is possible to reduce the number of components as compared with the case where the monitor unit 616 is configured by using an element different from the light receiving element 612h.

According to the third embodiment as described above, it is possible to achieve the same effects as those of the first embodiment described above.

Although the robot according to the invention has been described as above based on the illustrated embodiments, the invention is not limited thereto, and the configuration of each unit may be replaced with any configuration having the same function. Any other constituents may be added to the invention. Further, respective embodiments may be appropriately combined.

In the embodiments described above, the case where intensity of the optical signal of the optical wiring passing through the joint portion of the finger portion of the hand is adjusted according to the drive state of the joint portion has been described as an example, but the invention is not limited thereto. For example, for the optical signal of the optical wiring passing through the joint portion (joint portion of the robot arm) other than the joint portions of the finger portion of the hand, the intensity adjustment may be performed according to the drive state of the joint portion.

Further, in the embodiments described above, the case where the storing unit and the control unit related to adjustment of the optical signal intensity are incorporated in the control device outside the robot arm has been described as an example, but the invention is not limited thereto. For example, the control unit and the storing unit may be incorporated in an optical module (for example, a controller) inside the robot arm. In this case, it suffices if the optical module is configured to be able to receive necessary information from the control device.

Further, in the embodiments described above, the case where the hand of the robot includes five fingers has been described as an example, but a shape of the hand is not limited to those in the embodiments described above. For example, the number of fingers that a hand includes may be two or more, four or less, or six or more.

In the embodiments described above, the configuration in which the robot is a dual arm robot (seven-axis articulated robot) has been described, but the robot is not particularly limited, and may be, for example, an articulated robot (with six or less axes or eight or more axes) other than seven axis articulated robot, single-arm robot, SCALA robot, and the like.

In the embodiments described above, the case where the optical transmission device is incorporated in the robot has been described as an example, but the optical transmission device can be incorporated in equipment other than the robot. In particular, the effects described above can be obtained in equipment that is incorporated to change the bending state of optical wiring.

The entire disclosure of Japanese Patent Application No. 2017-198222, filed Oct. 12, 2017 is expressly incorporated by reference herein.

What is claimed is:

1. A robot comprising:

two links;

a joint portion that connects the two links so as to be rotatable relative to each other;

a control unit that controls an operation of the joint portion;

a storing unit that stores information on a relationship between a bending amount of the joint portion which corresponds to the operation state of the joint portion and an intensity adjustment amount of the optical signal; and an optical transmission device that transmits an optical signal between the two links, wherein the optical transmission device includes an optical wiring that passes through the joint portion and allows the optical signal to propagate and a light source unit that is disposed on one of the two links and emits the optical signal, and the control unit transmits a signal for adjusting intensity of the optical signal according to an operation state of the joint portion to the optical transmission device.

2. The robot according to claim 1, further comprising:

a hand including the two links.

3. The robot according to claim 1, wherein the control unit includes a computation unit that computes an intensity adjustment amount of the optical signal based on a bending amount of the joint portion which corresponds to the operation state of the joint portion.

4. The robot according to claim 1, wherein the optical transmission device includes a monitor unit that is disposed on the other of the two links and monitors a light amount of the optical signal propagated through the optical wiring.

5. The robot according to claim 4, wherein the monitor unit is a light receiving element that receives the optical signal propagated through the optical wiring.

6. A method of operating a robot, the robot comprising:

two links;

a joint portion that connects the two links so as to be rotatable relative to each other;

a control unit that controls an operation of the joint portion;

a storing unit that stores information on a relationship between a bending amount of the joint portion which corresponds to the operation state of the joint portion and an intensity adjustment amount of the optical signal; and an optical transmission device that transmits an optical signal between the two links, wherein the optical transmission device includes an optical wiring that passes through the joint portion and allows the optical signal to propagate and a light source unit that is disposed on one of the two links and emits the optical signal, and wherein the control unit transmits a signal for adjusting intensity of the optical signal according to an operation state of the joint portion to the optical transmission device.

* * * * *